United States Patent Office 3,501,411
Patented Mar. 17, 1970

3,501,411
PROCESS OF PREPARING NUCLEAR FUEL
Leonard V. Triggiani, Silver Spring, Norton Haberman, Bethesda, and Moises G. Sanchez, Severna Park, Md., assignors to W. R. Grace & Co., New York, N.Y., a corporation of Connecticut
No Drawing. Filed June 21, 1967, Ser. No. 647,606
Int. Cl. G21c 21/02, 3/00; B01j 13/02
U.S. Cl. 252—301.1                  8 Claims

ABSTRACT OF THE DISCLOSURE

A process for preparing a nuclear fuel containing small but significant amounts of a burnable poison by direct impregnation of a suitable matrix.

---

This application relates to a process for preparing a nuclear fuel system. In one specific embodiment, it relates to a process for preparing a nuclear fuel which contains a certain amount of burnable nuclear poison.

In recent years, oxides of actinide metals have been of paramount importance in the field of nuclear fuel development. These oxides may be used in the form of pellets or may be in the form of a regular granule which can be packed to high density by swaging or vibratory techniques. The fabrication of these oxide particles into dense form from ceramic powder requires compaction of pellets followed by prolonged sintering at extreme temperatures. Fuel pellets may be subjected to precise grinding because of the cutting requirements of the nuclear fuel structure.

Uranium dioxide is one of the better known oxide fuels and is also used as one of the components of composite fuels such as thoria-urania, urania-plutonia, etc. Some of the problems encountered in the preparation of these fuels have been solved in recent years by the development of processes for the preparation of microspheres. These microspheres eliminate the principal disadvantages of preparation of the cermet fuel elements by the older more conventional techniques.

One of the difficulties arising in nuclear fuel technology is the tendency for changes to occur in distribution of the neutron flux in the fuel. These changes result in generation of heat to an undesirable degree in the fuel element. One of the methods that has been suggested for avoiding this problem is to make use of a "burnable poison" in the fuel elements. For example, a compound of a material having a high capture cross section for neutrons but one that is converted to a capture product having a low capture cross section may be included in the fuel elements. Samarium, for example, may be included as a component of the fuel. Samarium has a high capture cross section but the capture product of samarium has a low capture cross section for neutrons. Other elements that serve the same function are gadolinium, dysprosium, europium, boron and hafnium, for example.

We have developed a novel process for preparing fuels of this type. For purposes of simplicity our process will be described as our preferred microsphere impregnation process. However, it is obvious that our process is applicable for preparing fuels in any desired physical form.

Our preferred process comprises the following steps:
(1) Selection and dissolution of the fuel raw materials.
(2) Preparation of sols of these materials.
(3) Formation of microspheres in the sols.
(4) Washing and drying the microspheres.
(5) Introduction of the additive into the microsphere product.
(6) Sintering the microsphere containing the additive to the desired temperature.

In the first step of our process, the material to be used as a fuel as well as the "burnable poison" are selected. The nuclear fuel may be a mixed oxide nuclear fuel. In addition to the thoria-urania (U–238) fuel, the fuel may contain fissionable materials. The fuel may be a thoria-U–233 or U–235 composite, a urania (238) U–233 or U–235 composite or a urania (238) plutonia composite. The "burnable poison" may be any element having the nuclear properties described above. This material is prepared in solution form for introduction into the microspheres at a later stage of the process. In this step of our process, the urania or other actinide element component is dissolved to prepare a solution of nitrate, chloride, etc. In the second step of the process, the solution is converted to sol form. Suitable sols can be prepared by gradually removing anions from a dilute solution of the actinide metal salts, while maintaining the system at elevated temperatures. The preferred techniques suitable for anion removal are:
(1) Electrodialysis using anion permeable membranes.
(2) Dialysis using anion permeable membranes.
(3) Ion exchange using resin in hydroxide form.
(4) Peptization of washed hydroxides with an acid.
(5) Electrodialysis of solutions, the anions of which are oxidized to a volatile compound or state.

In the next step of our process, the sols are converted to microspheres. The method of preparing these microspheres is not part of this invention. It is covered in copending application Ser. No. 541,519, filed Apr. 11, 1966, now U.S. Patent 3,331,785. Briefly, the process comprises forming the sols into droplets and drying the sols in a column of solvent passed in countercurrent direction to the sol particles. The formed microspheres are removed from the bottom of the column and washed. The washed microspheres are dried and the microspheres in the size range desired for the preparation of our product are selected by separation by using sieves having openings in the desired range.

In cases where it is desirable, microspheres or larger sized spheroids can be prepared directly from a solution. In this process a solution of a salt of the matrix material is admixed with a water soluble resin that increases in viscosity in an alkaline medium. The droplets of solution are fed into an aqueous alkaline solution to form microspheres or spheroids. The particles are recovered and dried.

In some cases, urania microspheres may be hyperstoichiometric in oxygen at this stage and must be reduced to the dioxide if the final microspheres are to be free of interparticle sludge, etc. The reduction can be carried out using the suitable technique such as hydrogen reduction, etc. The microspheres are weighed and separated into batches of desired size to facilitate the next step of the process.

The "burnable poison" is incorporated into the microspheres by an impregnation technique. This is done by preparing a solution of a salt of the "poison additive." In the preparation of a samarium containing microsphere, for example, the solution of a samarium salt is prepared in a concentration sufficiently high to give the desired samarium content to the microspheres. The samarium solution is added in an amount sufficient to fill the internal pores and bring the spheres to incipient wetness. This step is conveniently carried out in an atmosphere of inert gas such as argon, for example. This protects the urania from oxidation and, if necessary, can be used to provide part of the agitation during the impregnation step. This impregnation may be carried out in any suitable manner.

A satisfactory laboratory method is to divide the urania into 20-gram batches. Each of the batches of the microspheres is transferred to a fritted disc filter funnel and an atmopshere of argon is passed upwardly through the microspheres. The impregnation solution is made up to contain the desired amount of samarium or other impregnant. This solution is admitted drop-wise from a burette into contact with the microspheres with suitable stirring to be sure that the solution is distributed uniformly over the microspheres.

After the impregnation step, the spheres are dried in a vacuum drier over a period of 10 hours. The temperature is increased from room temperature to 120° C. over this period. The best results are obtained when the spheres are dried in steps and are maintained at the temperature of the step for a period of about 2 hours. The impregnated spheres are then ready for sintering. A suitable sintering cycle for samarium impregnated microspheres, for example, comprises sintering in hydrogen at 500° C. for a period of 3 hours, followed by increasing the temperature to the range of 1100 to 1300° C. for .5 to 3 hours.

Obviously changes can be made in the impregnation technique. In certain cases, it will be desirable to impregnate the microspheres with "burnable poisons" that have physical properties that make it impossible to use the conventional solution impregnation technique described above. If, for example, it was desirable to impregnate the microspheres with boron, the spheres could be sintered to about 90 percent density, impregnated and the final sintering step completed. The spheres could also be impregnated using gaseous systems as well as the liquid system described above. The amount of the "burnable poison" would, of course, depend on the use contemplated. In a gadolinium impregnation, for instance, the gadolinium is present in amounts from about 6.5 to 7 percent.

The sintering time and temperature depends on the final density achieved in the product. With gadolinium, for example, the suitable densities can be achieved by heating at temperatures as low as 1100° C. for periods of as short as 30 minutes. The density can be greatly increased by increasing the temperature to 1300° C. and maintaining this temperature for a period of 80 minutes.

Our invention is illustrated by the following specific but nonlimiting examples.

EXAMPLE I

This example describes the process for preparing urania microspheres suitable as a base material in our preparation.

The microspheres were prepared by drying $UO_2$ sol droplets by settling the droplets through a counterflow solvent of controlled temperature and water content. The equipment used was a column 7 feet long and 3 inches in diameter, equipped with a conical bottom for collecting the dried spheres which settled through the solvent mixture. A 50-liter three-necked Stewart distillation flask was fitted with a condenser and solvent water separator was used for water removal from the system. The separated solvent was returned to the pot and distillate water either discarded or controlled amounts were returned to the pot as required to maintain a given water content or to control the distillation temperature.

A sol was prepared by electrodialysis technique from uranyl chloride solution and was concentrated to a urania content of 10 weight percent. This sol was injected into the top of the column containing n-hexanol. The column was operated at an inlet temperature of 98° C. and an outlet temperature of 63° C. The hexanol was passed through the column at the rate of 700 ml. per minute.

The sol was injected centrally into the top of the column, and the spheres were collected in the cone at the bottom of the column.

EXAMPLE II

The microspheres were washed and dried. The spheres were separated as to size using a sieve to separate the spheres in the 60- to 80-micron size range. The spheres where then reduced in an atmosphere of hydrogen for a period of 4 hours and were weighed into 20-gram batches in an argon filled dry box.

The porosity of the spheres were determined, and it was found that 5.65 ml. of solution would be sufficient to bring the spheres to incipient wetness. A gadolinium nitrate solution was prepared to provide sufficient gadolinium in this quantity of solution to prepare a product containing between 6 and 7 weight percent gadolinium. The microspheres were transferred to a fritted disc filter funnel. The bottom of the funnel was fitted with an argon supply tube and the argon was turned on before the microspheres were transferred to the funnel. The impregnating solution of gadolinium was admitted dropwise from a burette. The contents of the funnel was stirred manually and with the gas stream as the impregnating solution was being added. After all the impregnating solution was added, the spheres were immediately placed in a vacuum drier with no further treatment. The spheres were dried using the following schedule:

The oven was heated to a temperature of 40° C. and maintained at that temperature for 2 hours. The temperature was then increased to 60° C. for 2 hours, followed by an increase to 80° C. for 2 hours and an increase to 100° C. for 2 hours with final drying at 120° C. for 2 hours.

The microspheres were sintered in an atmosphere of hydrogen by bringing the furnace to a temperature of 500° C. and maintaining that temperature for a period of 3 hours. The microspheres were then densified by heating to 1300° C. for a period of 80 minutes. The final product had a density of 9.6 and contained 6.09 weight percent gadolinium.

EXAMPLE III

The effect of sintering temperature and time on the product density was investigated in a series of runs in which the microspheres were sintered at a temperature of 1200° C. The data collected in this series of runs is set out in the table below.

TABLE I

| $Gd_2O_3$, wt. percent | Sintering Conditions | | Density, g./cc. |
|---|---|---|---|
| | Temperature, ° C. | Time, min. | |
| 6.5 | 1,200 | 60 | 8.7 |
| 6.87 | 1,200 | 45 | 8.2 |
| 6.76 | 1,200 | 30 | 5.8 |

It is apparent from these runs that the density is dependent on the sintering time and temperature. The microspheres in this run contained 6.5 to 6.87 percent weight percent gadolinium. Increasing the time from 30 to 45 minutes resulted in a substantial increase in the density of the product.

EXAMPLE IV

In this example, the sintering temperatures were increased to 1140, 1200 and 1300° C. In each of these runs, the furnace was maintained at the sintering temperature shown for a period of 1 hour with the exception of the run at 1300° C. when the microspheres were sintered for a period of 80 minutes. The data collected in this series of runs is set out in the table below:

TABLE II

| $Gd_2O_3$, wt. percent | $Gd_2O_3$, temperature, ° C. | Sintering Density, g./cc. |
|---|---|---|
| 6.53 | 1,140 | 8.2 |
| 5.76 | 1,140 | 9.02 |
| 5.9 | 1,140 | 9.4 |
| 6.91 | 1,200 | 8.7 |
| 6.79 | 1,200 | 8.7 |
| 6.84 | 1,200 | 8.7 |
| 6.09 | 1,300 | 9.6 |

These data further emphasize the dependence on sintering time and temperature. The product was definitely improved as the sintering temperature increased. Sintering for a period of 80 minutes at a temperature of 1300° C. resulted in a product having a density of 9.6.

EXAMPLE V

This example illustrates the utility of our process in the preparation of microspheres containing other ionic species as well as "burnable poisons."

Urania microspheres were impregnated using the general technique described in Example II above. Solutions of gadolinium, zirconium, yttrium, boron, magnesium and aluminum salts were prepared dissolving the salts in 50 ml. of water.

| Material: | Weight in grams |
|---|---|
| $Gd_2O_3$ | 1.06 |
| $ZrOCl_2 \cdot 8H_2O$ | 1.88 |
| $YCl_3$ | 1.12 |
| $HBO_3$ | 0.362 |
| $Mg(NO_3)_2 \cdot 6H_2O$ | 1.50 |
| $Al(NO_3)_3 \cdot 9H_2O$ | 2.19 |

The materials were converted to the nitrate, where possible, and solutions 0.1167 molar in the metal ion were prepared. The urania spheres prepared according to the process described in Example I were weighed out in 10-gram batches. Each batch was transferred to a filtering crucible. The solutions prepared above were added to the crucible. The solution was in contact with the dried urania spheres for a period of 20 minutes. The solution was then drawn off and the impregnated spheres contacted with 50 ml. of an ammonium hydroxide solution diluted with four volumes of water. The spheres were then washed with 225 ml. portions of water and dried in an oven. The spheres were sintered using the sintering cycle described in Example II.

Samples of the spheres were submitted for analysis. The results are shown in the table below.

TABLE III

| Metal | Percent metal in spheres (by emission spectroscopy) | Density in g./cc. | Average crush strength in pounds |
|---|---|---|---|
| Gadolinium | 0.10 | 10.34 | 2.68 |
| Zirconium | 0.41 | 10.62 | 3.88 |
| Yttrium | 0.10 | 10.60 | 2.46 |
| Boron | 0.02 | 10.75 | 1.76 |
| Magnesium | 0.05 | 10.56 | 3.09 |
| Aluminum | 0.10 | 10.62 | 3.19 |

It is obvious from a review of these data that the desired metals have been introduced into the spheres by impregnation. The crush strength of the product is adequate.

Obviously, many modifications and variations of the invention may be made without departing from the essence and scope thereof and only such limitations should be applied as are indicated in the appended claims.

What is claimed is:
1. A process for preparing a nuclear fuel which comprises the steps of:
   (a) Preparing colloidal feeds of thoria, urania and mixtures thereof
   (b) Forming microspheres from said sols
   (c) Impregnating said microspheres with a solution of a salt of a burnable nuclear poison
   (d) Sintering said impregnated particles at a temperature above 1000° C. for at least 1 hour.
2. The process according to claim 1 wherein the burnable nuclear poison is selected from the group consisting of samarium, gadolinium, boron and hafnium.
3. The process according to claim 1 wherein fissionable components selected from the group comprising plutonium, uranium (233) and uranium (235) are incorporated in the nuclear fuel at some stage prior to the impregnation step.
4. The process according to claim 1 wherein the microspheres are washed with water and dried under vacuum prior to the impregnation step.
5. The process according to claim 1 wherein the sols are formed by electrodialysis of solutions of salts of thoria or urania and the microspheres are formed by dehydrating sol droplets in a column of a solvent.
6. The process according to claim 1 wherein the spheres are impregnated with 1 to 50 grams of $Gd(NO_3)_3$ per 100 grams of solution.
7. The process according to claim 1 wherein the spheres are impregnated with 1 to 50 grams of $Sm(NO_3)_3$ per 100 grams of solution.
8. The process according to claim 1 wherein the spheres are impregnated with a 0.01–0.85 molar boric acid solution.

References Cited

UNITED STATES PATENTS

| 3,281,373 | 10/1966 | Smith et al. | 252—301.1 |
| 3,280,011 | 10/1966 | O'Connor et al. | 252—301.1 X |
| 3,349,152 | 10/1967 | Watanabe et al. | 264—.5 |
| 3,361,857 | 1/1968 | Rose | 264—.5 |
| 3,372,213 | 3/1968 | Nishiyama et al. | 264—.5 |

CARL D. QUARFORTH, Primary Examiner

M. J. SCOLNICK, Assistant Examiner

U.S. Cl. X.R.

176—93; 264—.5